Sept. 29, 1964      F. F. WILCOX      3,150,409
DEHAIRING AND SKINNING DEVICE
Filed April 10, 1963
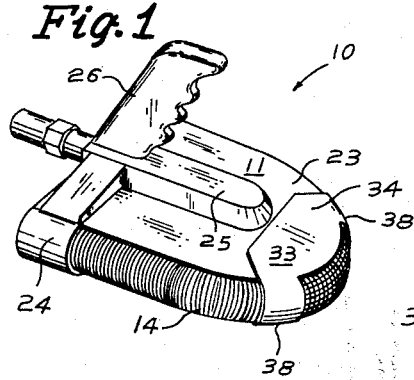
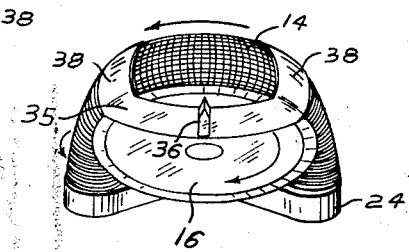
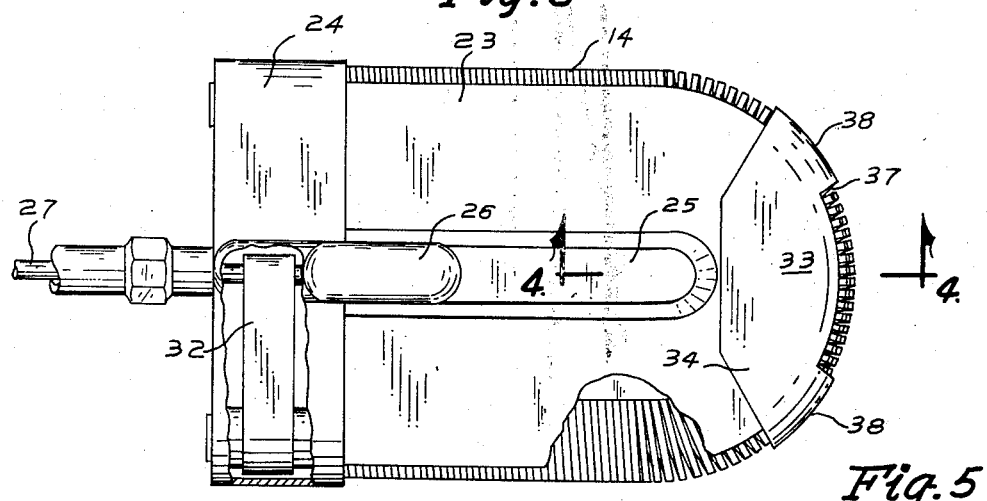
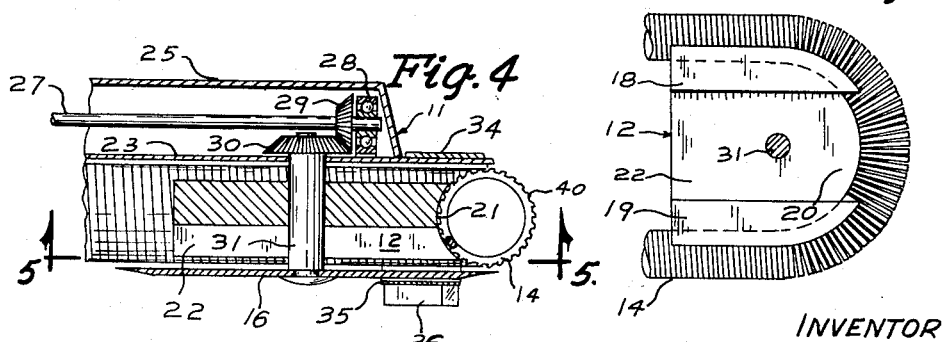
INVENTOR
FRED F. WILCOX
BY
Dick, Zarley & Henderson
ATTORNEYS United States Patent Office 3,150,409
Patented Sept. 29, 1964

3,150,409
DEHAIRING AND SKINNING DEVICE
Frederick F. Wilcox, 1506 Beaver Ave.,
Des Moines, Iowa
Filed Apr. 10, 1963, Ser. No. 272,135
11 Claims. (Cl. 17—21)

This invention relates to a dehairing and skinning device and, in particular, to a hand tool for use in the processing of slaughtered hogs.

Automatic and semiautomatic dehairing and skinning machines are now being used in the processing of slaughtered hogs. However, certain areas of the animal, such as the belly, cannot be completely skinned and dehaired with the production line equipment; and heretofore hand finishing with a knife would be performed manually. As might be expected, it is difficult to cut away a thin layer of skin and, as a consequence, considerable fat tissue goes with the skin, which, if used for gelatin, will require additional defleshing. Moreover, less fat is left on the pork for bacon.

Therefore, it is an object of this invention to provide an animal dehairing and skinning device, which can be used to remove skin, hair root, long hair, layers of fat and lean and membrane.

It is a further object of this invention to provide an animal dehairing and skinning device, which is adjustable to cut any thickness of animal tissue desired.

It is a further object of this invention to provide an animal dehairing and skinning device, which has a cutting depth limiting means.

It is a further object of this invention to provide an animal dehairing and skinning device, having a revolving spring roll and a rotating cutter blade, which may be powered from a single power means.

It is a further object of this invention to provide an animal dehairing and skinning device having a revolving spring wherein adjacent coils open and close during each revolution.

It is a further object of this invention to provide an animal dehairing and skinning device having a helical spring, which advances a product in a direction opposing the direction of rotation of a cutting blade.

It is a further object of this invention to provide an animal dehairing and skinning device having a roll spring, which pulls a product into engagement with a rotary cutting blade.

A further object of this invention is to provide an animal dehairing and skinning device, which is simple in design, economical to manufacture and refined in appearance.

Various other objects and advantages will appear from the following description of one embodiment of this invention, and the novel features will be particularly pointed out hereinafter in connection with the appended claims and illustrated in the accompanying drawings in which:

FIG. 1 is a perspective view from the top of the dehairing and skinning device;

FIG. 2 is a perspective view from the bottom of the dehairing and skinning device;

FIG. 3 is a top plan view of the dehairing and skinning device drawn to an enlarged scale with certain portions of the device broken away;

FIG. 4 is a fragmentary cross sectional view to a reduced scale taken along line 4—4 in FIG. 3 of the dehairing and skinning device; and FIG. 5 is a fragmentary bottom plan view taken along line 5—5 of FIG. 4 with the cutting blade and guard removed for purposes of clarity of illustration.

The dehairing and skinning device of this invention is referred to generally by reference numeral 10 in FIG. 1 of the drawings. As shown in FIGS. 4 and 5, this invention comprises in its simplest form a housing 11 including a frame 12 embraced by a helical spring 14 and provided with a cutting blade 16 on one side of the frame.

The frame 12 has a pair of parallel side portions 18 and 19 (FIG. 5) joined by a rounded end 20. A concave continuous recess 21 (FIG. 4) is formed in the peripheral edge of the parallel sides 18 and 19 and the end 20 and receives in mating engagement therewith the elongated helical roll spring 14. A channel 22 is formed in the bottom side of the frame 12 extending the length thereof between the side portions 18 and 19.

The frame 12 and spring 14 are positioned in the housing 11, which has a cover portion 23 extending along the top side of the frame and is integral with a spring end casing 24 extending around the parallel free ends of the spring 14.

A gear box 25 (FIGS. 1 and 4) is provided on the cover portion 23 an dextends centrally and longitudinally thereof from the spring end casing 24. A handle 26 is vertically affixed to the top of the gear box 25 adjacent the spring end casing 24.

In the gear box 25 is provided a drive shaft 27 extending rearwardly of the device 10 and coupled to a suitable power supply. The other end of shaft 27 is mounted in a ball bearing support 28, which is affixed to the cover portion 23. Rearwardly of the support 28 is a beveled gear 29 in engagement with a beveled gear 30 provided on the upper end of a shaft 31 extending through the cover portion 23 and the frame 12. The cutting blade 16 is suitably secured to the lower end of the shaft 31 in close spaced relationship to the lower surface of the spring 14 (FIG. 4).

Adjacent the other end of the shaft 27 in the spring end casing 24, is an endless belt 32 coupled to one end of the spring 14 (FIG. 3).

A U-shaped guard 33 is provided on the cutting end of the device 10 with a leg 34 in fixed engagement with the cover portion 23 and a leg 35 (FIG. 4) closely spaced from the outer or lower face of the cutting blade 16. A cutting depth limiting member 36 is provided on the leg 35 and extends over the peripheral edge of the cutting blade 16 (FIG. 2) exposed through a mouth opening 37 (FIG. 3) between the bight portions 38 of the guard 33.

As clearly illustrated in FIG. 4, the coils of the roll spring 14 are serrated to form teeth 40. Although teeth 40 may be provided on all the coils, they can only be useful if they are in the area of the mouth opening 37 in the guard 33 (FIG. 4).

In operation it is seen that shaft 27 will revolve the roll spring 14 about its longitudinal axis in the direction of the arrow (left side of FIG. 2) toward the cutting blade 16 and simultaneously rotate the cutting blade 16 in a clock-wise direction as indicated by the arrow on the blade. Since the helical roll spring 14 is coiled in the right hand direction and remains stationary along its longitudinal axis as it is revolved, material engaging it will be advanced in a counter clockwise direction as indicated by the top arrow in FIG. 2. Thus, skin and hair or the like will be moved by the roll sping 14 perpendicularly toward the blade 16 and in a direction concentric and opposing the circular movement of the rotating blade 16 on its axis of rotation, shaft 31. While this is the preferred relationship between the moving parts of the device 10 to obtain the best cutting action, an alternative arrangement is to use a left hand roll spring, which would advance the product in the same direction as the blade 16 is rotating, or conversely rotate the blade in the opposite direction from that indicated in FIG. 2.

It is to be understood that a single power source as shown may be used successfully or separate sources as desired and at any relative speed. As an example, the spring 14 may be rotated at 400 r.p.m. and the blade 16 at 600 to 900 r.p.m.

As is illustrated in FIG. 5, the coils or loops in spring 14 are forced open at the outside providing a space for entry of hairs and the like. As the coils are rotated in toward the cutting blade the space between adjacent coils is progressively reduced until there is side edge contact between the coils on the inside of spring roll 14 adjacent the rounded end 20 of the frame 12. It is obvious that cutting action will occur between mating side edges of adjacent coils and secondly it will be cut upon drawing into engagement with the rotating blade 16. After the product is cut it is discharged into the channel 22 and out the rear of the device 10 (FIGS. 4 and 5).

It is of particular importance that cut skin will not roll up, on the roll spring 14, but will be released into the channel area 22. As the skin moves rearwardly over the roll spring 14 due to the pulling action of the teeth 40 and the clamping action between adjacent coils the outer side edges of the skin are brought closed together in a bunching manner as the skin approaches the rounded end 20 of the frame 12. The perimeter on the outside of the roll spring is greater than that on the inside due to the smaller radius of curvature of the latter, and thus the effective width of the cut product is reduced proportionally. The tendency of the skin to wrap around the roll spring 14 is thereby eliminated.

The thickness of the product cut may be varied in several ways. The distance between the spring roll 14 and the cutting blade may be varied. Also, the blade may be made to extend farther beyond the tangential point on the spring roll to permit the blade to make a larger or deeper bite into the product. The depth on the other hand may be limited by increasing the thickness of the depth cutting, limiting member 36, thereby preventing the cutting blade from cutting too deeply into the product.

Ordinarily, the cutting depth limiting member 36 will be used only when layers of fat are to be cut from the product. The sharp forward edge of the member 36 will cut forwardly through the fat and the blunt outer side will pass downwardly in the fat but will not cut into solid, or red meat. Therefore the dull outer side of the member 36 will ride on the red or solid meat and act as a gauge to limit the downward movement of the cutting blade 16 in the outer layer of fat. Thus the desired uniform thickness of fat will be left on the meat.

Some changes may be made in the construction and arrangement of my dehairing and skinning device without departing from the real spirit and purpose of my invention, and it is my intention to cover by my claims, any modified forms of structure or use of mechanical equivalents which may be reasonably included within their scope.

I claim:

1. In a dehairing and skinning device, a frame having an arcuate concave recess in cross section formed in the outer edge thereof and one portion of said edge provided with said recess being arcuate in shape;

a helical spring positioned in said recess and adapted to be revolved about its longitudinal axis;

a circular cutting blade rotatably mounted on one side of said frame and having its peripheral edge overlapping said helical spring; and means for revolving said helical spring and rotating said blade, said spring being rotated in a direction such that a point on the outer face thereof opposite said recess moves toward the peripheral edge of said blade.

2. The structure of claim 1 wherein said spring has teeth formed on its outer face.

3. In a dehairing and skinning device, a frame having one end rounded and a continuous semicircular in cross section recess formed in the edge of said rounded end;

a helical spring positioned in said recess and adapted to be revolved about its longitudinal axis;

a cutting blade rotatably mounted on one side of said frame and adapted to be rotated with its peripheral edge overlapping said spring; and means for revolving said spring and rotating said blade, said spring being revolved in a direction such that a point on the outer face thereof opposite said recess moves toward the peripheral edge of said rotating blade.

4. The structure of claim 3 wherein said helical spring has teeth formed on its outer face.

5. In a dehairing and skinning device, a frame having a pair of parallel sides, and a rounded end, a continuous concave recess formed in each of said parallel sides and rounded end;

an elongated helical spring rotatably secured to said frame in said continuous recess;

a cutting blade rotatably provided on a side of said frame being perpendicular to said parallel sides, the peripheral edge of said blade overlapping said spring at said rounded end of said frame; and means operatively engaging said spring and blade to provide for their rotation.

6. The structure of claim 5 wherein said frame is provided with a guard extending over the rounded end thereof and having an opening formed therein exposing said spring and said blade.

7. The structure of claim 5 wherein said frame is provided with a guard extending over the rounded end thereof and having an opening formed therein exposing said spring and said blade, said guard on the blade side of said frame being provided with a cutting depth limiting means.

8. The structure of claim 5 wherein said frame has a hollowed portion on said blade side intermediate said parallel sides to permit escape of cut skin and hair.

9. The structure of claim 5 wherein said helical spring comprises right handed coils to advance the skin and hair along said spring in the opposite direction of rotation of said blade.

10. In a dehairing and skinning device, a frame having a pair of parallel sides, and a rounded end, a continuous concave recess formed in each of said parallel sides and rounded end;

an elongated helical spring positioned in said continuous recess and rotatably secured to said frame along each of said parallel sides, the inner side edges of adjacent coils of said spring being in engagement at a point of revolution adjacent said rounded end and separated at a point of revolution remote from said rounded end;

a cutting blade rotatably provided on a side of said frame being perpendicular to said parallel sides, the peripheral edge of said blade overlapping said spring at said rounded end of said frame; and means operatively engaging said spring and blade to provide for their rotation.

11. In a dehairing and skinning device,
a frame having an arcuate concave recess in cross-section formed in the outer edge thereof and one portion of said edge provided with said recess being arcuate in shape;
an elongated member positioned in said recess and adapted to be revolved about its longitudinal axis;
a circular cutting blade rotatably mounted on one side of said frame and having its peripheral edge overlapping said elongated member; and
means for revolving said elongated member and rotating said blade, said elongated member being rotated in a direction such that a point at the outer face thereof opposite said recess moves toward the peripheral edge of said blade.

No references cited.